United States Patent [19]

Ouchi et al.

[11] Patent Number: 4,694,985
[45] Date of Patent: Sep. 22, 1987

[54] METHOD OF PRODUCING TITANIUM CLAD STEEL PLATE BY HOT ROLLING

[75] Inventors: Chiaki Ouchi; Masakazu Niikura, both of Kanagawa; Hiroyoshi Suenaga, Yokohama, all of Japan

[73] Assignee: Nippon Kokan Kabushiki Kaisha, Tokyo, Japan

[21] Appl. No.: 892,576

[22] Filed: Aug. 1, 1986

[51] Int. Cl.$^4$ .............................................. B23K 31/02
[52] U.S. Cl. ................................. 228/235; 228/263.15
[58] Field of Search .................. 228/235, 263.21, 221, 228/233, 234, 263.15, 263.11

[56] References Cited

U.S. PATENT DOCUMENTS 4,023,936  5/1977  Morse et al. ...................... 228/235

FOREIGN PATENT DOCUMENTS 0137187  8/1984  Japan .......................... 228/263.21
0567581  8/1977  U.S.S.R. ........................... 228/235
0579115  11/1977  U.S.S.R. ........................... 228/235

Primary Examiner—Nicholas P. Godici
Assistant Examiner—Karen Skillman
Attorney, Agent, or Firm—Henry C. Nields

[57] ABSTRACT

For producing titanium clad steel plates by hot rolling, oxide of Mo or V is used as an intermediate material, and a slab assembly is formed with ferrous bases and titanium cladding materials. At least one side of cladding surfaces of the bases and the cladding materials is coated with an oxide of Mo or V of 20 to 300 g/m$^2$, and an interior of the slab assembly is air-discharged less than $10^{-1}$ torr, and the slab assembly is heated at temperatures between a melting point of the employed oxide plus 50° C. and 1050° C. and undertaken with hot rolling.

5 Claims, 1 Drawing Figure

FIG_1
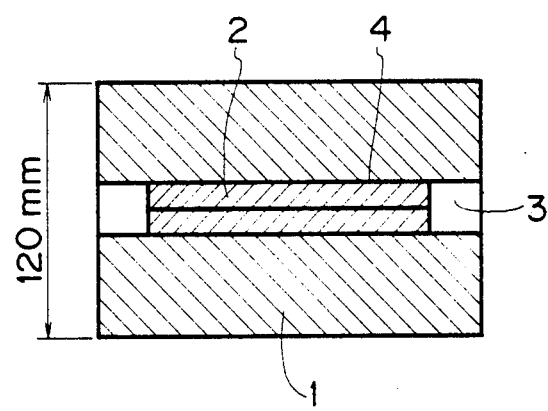

METHOD OF PRODUCING TITANIUM CLAD STEEL PLATE BY HOT ROLLING

FIELD OF THE INVENTION

This invention relates to a method of producing titanium clad steel plate by a hot rolling procedure, excellent in cladding characteristics and economical in production cost.

For producing titanium clad steels, in general there are an explosion bonding process which bonds materials by powder explosion in cold work, and a hot rolling process which heats and hot-rolls a slab assembly.

The explosion bonding process is excellent in bonding, but the production is difficult and cost is high. This process is restricted by producible sizes.

The hot rolling process is more popular for the production of stainless steel clad plates, and applicable to mass-production. However this is not suitable to production of titanium clad steel plates. This is because titanium very easily reacts, at high temperatures, with the air, active gases and other metals at high temperatures, and so titanium is characterized by brittled layers on parts to be cladded during carrying out the hot rolling. It is difficult to provide sound cladding.

Therefore, for producing the titanium clad steel plate via hot rolling, a material should be interposed between a titanium and the base material in order to prevent forming of compounds at the boundary of titanium and iron. As such intermediate materials, preferable are those metals which make a perfect solid solution with each of titanium and iron. Ag, Mo or V have been used in foil or they have been plated or undertaken with spraying process on a cladding face.

These metals are precious, and products of titanium clad steel plates are expensive accordingly.

SUMMARY OF THE INVENTION

This invention has been realized to improve defects involved with the prior art, and is to provide a method which is excellent in the joining property and cheap in the production cost. Basically the hot rolling process is adopted, and cheap oxide of Mo or V are used as an intermediate material which has been a cause of the cost-up in the conventional processes, and conditions of heating temperatures and others suitable to said oxides are specified.

In the invention, a slab assembly is at first formed with ferrous bases and titanium cladding materials. Then, at least one side of connecting surfaces of said bases and the cladding materials is coated with an oxide of Mo or V of 20 to 300 g/m$^2$, and the interior of said slab assembly is air-discharged less than $10^{-1}$ torr, and the slab assembly is heated at temperatures between a melting point (m.p.) of said oxide plus 50° C. and 1050° C., and undertaken with the hot-rolling.

Herein, the most important feature of the invention is to use the cheap oxide of Mo or V, and it serves functions as follows.

$MoO_3$ as Mo oxide, or $V_2O_5$ as V oxide is coated thereon. The m.p. of $MoO_3$ and $V_2O_5$ are 795° C. and 690° C. respectively. If the heating is performed at the temperatures higher than said m.p., the coated $MoO_3$ or $V_2O_5$ is fused and exists as a uniformly fused film by cleansing the coated surface. If the heating is continued, the film like fused $MoO_3$ or $V_2O_5$ is reduced by titanium of the cladding metal, and ferrous Mo or V is precipitated on the cladding titanium plate, and serves as the intermediate material when hot-rolling on the slab assembly. Ti oxide generated then forms a solid solution with Ti, but if the oxide were limited to 20 to 300 g/m$^2$, a joined part without problems would be obtained.

As mentioned above, Mo or V oxide brings about activation, as fused flux, on the surface of the cladding metal, and has two functions of strengthening the bonding force, and preventing, as the intermediate materials, formation of compounds at the boundary between the metals. Limits are specified to the coating amount, the air pressure and the heating temperatures in order to display said two functions at the maximum.

BRIEF DESCRIPTION OF THE DRAWING

FIG. 1 of the attached drawing is an explanatory view of a structure of slab assembly, an exemplified embodiment of the invention.

DETAILED DESCRIPTION OF THE PREFERRED EMBODIMENT OF THE INVENTION

As the base, every steel material may be used which is industrially available, e.g., carbon steels, low alloy steels and others. Shapes are not limited so long as limitations in facility are not made to assembling, heating and rolling. For cladding materials, a pure titanium plate or various kinds of titanium alloys may be used, and sizing limitations are the same as the base material.

The base material and the cladding materials are cleansed at the surfaces thereof to an extent that oxidized layers have been almost perfectly removed by grinding, shot blast or other means. Subsequently, the surface of at least either one of the cladding material and the base material is coated with Mo oxide (e.g., $MoO_3$) or V oxide (e.g., $V_2O_5$).

With respect to $MoO_3$ and $V_2O_5$, no special conditions are required, but their powders are preferable in view of coating. The coating amount is more than 20 g to less than 300 g per 1m$^2$ of the cladding face of the slab assembly.

If the coating amount is less than 20 g, the fused film of $MoO_3$ or $V_2O_5$ is not found uniformly so that unevenness is generated in the intermediate materials (Mo or V) of the products. On the other hand, if it exceeds 300 g, oxidation of the titanium plate and absorption of oxide are increased, so that non-cladded spots are caused in the cladded part, and oxidation on the surfaces of the clad laminated materials is made remarkable. In addition, hardness of the clad laminated materials and that of the cladded materials at the cladding boundary are increased, and processability of the clad steel plate is decreased. Therefore, said limits are specified.

Surface-finished blank works as said above are laminated, and welded at four sides, for which a vacuum discharging is carried out less than $10^{-1}$ torr. If the vacuum degree is more than $10^{-1}$ torr, the reducing reaction of $MoO_3$ or $V_2O_5$ does not progress sufficiently and non-contacted part is created.

The thus set-up slab assembly is heated to the temperature between more than m.p. of $MoO_3$ or $V_2O_5$ plus 50° C. and not more than 1050° C. and rolled, and a titanium clad steel plate is produced. The reason for determining more than m.p. plus 50° C. is because below said temperatures, the fused film of $MoO_3$ or $V_2O_5$ is not spread uniformly, so that the intermediate materials (Mo, V) in the clad steel plate are characterized by unevenness.

The reason for determining not more than 1050° is because above said temperature, the fused layer of titanium-iron alloy having low m.p. and brittleness is formed at the cladding boundary, and as a result, cladded shaping is spoiled and cladding strength is weakened.

With respect to roll finishing temperatures and reduction ratio, no special limits are provided, but preferably the reduction ratio is about 5.

The oxides to be applied have been mentioned with reference to $MoO_3$ and $V_2O_5$, but of course the invention is not limited to them, and oxides of Mo or V having m.p. temperature of not more than 1000° C. are usable.

EXAMPLE

Table 1 shows the used rolled blank works. The base material was SM50, the cladding materials were pure titanium which were milling-finished ∇ (this mark shows degree of surface-finishing, and the base and the cladding material were treated with surface-finishing on the cladding faces thereof) on both cladding surfaces.

FIG. 1 shows a slab assembly, wherein 1 is base materials, 2 is cladding plates, 3 is intermediate materials and 4 is $MoO_3$ or $V_2O_5$.

For coating $MoO_3$ or $V_2O_5$, their powders thereof were suspended in the water and coated on the side of the pure titanium plate. After having been perfectly dried, the slabs were assembled, and the interior of the slab assembly was air-discharged less than $10^{-1}$ torr. The slabs were heated to the temperatures of 830 to 1000° C., and hot-rolled to 24 mm. A clad steel plate was produced in such manners. The reduction rate of each of rollings was about 10%, and the titanium clad steel plate had a thickness of 12 mm (10 mm "base metal"+2 mm "cladding metal"). The cladding degree was measured by a supersonic flaw detection, and shearing strength was measured by a shearing test. Processability of the titanium clad steel was appreciated by a bending test.

Table 2 shows producing conditions and quality characteristics of titanium clad steel plates. It is seen that, by coating the proper amount of $MoO_3$ or $V_2O_5$, the cladding degree and processability equivalent to those of an inserted pure Mo foil were provided, and $MoO_3$ or $V_2O_5$ coated materials were superior in the shearing strength. In the $MoO_3$ or $V_2O_5$ coating, it is seen that observations are necessary to the coating amount, the vacuum treatment and the rolling conditions for providing the effects of the invention.

The above statement refers to the symmetrically cladding slab but this invention may be also applied to asymmetrically cladding slabs.

As having described above, in the invention, the oxide of Mo or V is interposed between the base materials and the cladding materials, and the coating amount, the heating temperatures and the air-discharging are controlled, thereby to cause said oxide to serve as the immediate material, so that it is possible to produce titanium clad steels at low production costs, which are excellent in the cladding strength.

TABLE 1

| Materials | Materials Sizes (mm) | Surface treat. |
|---|---|---|
| S M 5 0 | 50 t × 200 w × 250$^l$ | Milling ∇ |
| Cladding metal of pure Ti | 10 t × 140 w × 190$^l$ | Milling ∇ |

TABLE 2

Producing conditions and Quality characteristics

| Coating conditions | Vacuum treat.*1 | Heating | Roll finish temperature | Cladding*2 | Shearing strength | Bending*3 |
|---|---|---|---|---|---|---|
| Inv. | | | | | | |
| 1 $MoO_3$ 20 g/m$^2$ | O | 1000° C. | 850° C. | 100% | 28.7 Kg/mm$^2$ | O |
| 2 $V_2O_5$ 50 g/m$^2$ | O | 1000° C. | 850° C. | 100% | 28.4 Kg/mm$^2$ | O |
| Comparison | | | | | | |
| 3 Non coating | O | 1000° C. | 850° C. | 100% | 15.1 Kg/mm$^2$ | X |
| 4 $MoO_3$ 15 g/m$^2$ | O | 1000° C. | 850° C. | 100% | 1.84 Kg/mm$^2$ | X |
| 5 $MoO_3$ 20 g/m$^2$ | O | 830° C. | 700° C. | 100% | 17.9 Kg/mm$^2$ | X |
| 6 $MoO_3$ 20 g/m$^2$ | X | 1000° C. | 850° C. | 37% | 9.4 Kg/mm$^2$ | X |
| 7 $MoO_3$ 350 g/m$^2$ | O | 1000° C. | 850° C. | 46% | 11.3 Kg/mm$^2$ | X |
| 8 Mo foil 50 μm | O | 1000° C. | 850° C. | 100% | 21.8 Kg/mm$^2$ | O |

*1Vacuum treatment: O: $>10^{-1}$ torr X: $>10^{-1}$
*2Cladding degree: According to JIS G0601
*3Bending Outside bending and inside bending of R = 1$^t$
O: Non-Separation
X: Separation

What is claimed is:

1. A method of producing titanium clad steel by hot rolling, comprising forming a slab assembly with ferrous base materials and titanium cladding materials, coating at least one side of the cladding surfaces of said base materials and said titanium cladding materials with oxides of Mo or V in the amount of 20 to 300 g/m$^2$, evacuating the interior of said slab assembly to a pressure of less than $10^{-1}$ Torr, heating at temperatures between the melting point of said oxide plus 50° C. and 1050° C. so as to reduce said oxide by the action of said titanium, and carrying out hot-rolling thereon.

2. The method of claim 1 wherein said oxide is $MoO_3$.

3. The method of claim 2 wherein said heating is at a temperature between 845° C. and 1050° C.

4. The method of claim 1 wherein said oxide is $V_2O_5$.

5. The method of claim 4 wherein said heating is at a temperature between 740° C. and 1050° C.

* * * * *